United States Patent [19]

Neilson et al.

[11] 4,216,495
[45] Aug. 5, 1980

[54] ELECTRO-OPTICAL SCANNING

[75] Inventors: Peter J. Neilson, Stroud; William J. Pickering, Winchcombe, both of England

[73] Assignee: Eltra Corporation, Toledo, Ohio

[21] Appl. No.: 885,245

[22] Filed: Mar. 10, 1978

[51] Int. Cl.³ .................... G03F 3/08; H04N 1/46; H04N 1/04
[52] U.S. Cl. .................... 358/80; 358/78; 358/285
[58] Field of Search .................... 358/75–80, 358/285, 287

[56] References Cited

U.S. PATENT DOCUMENTS

| | | | |
|---|---|---|---|
| 1,854,315 | 4/1932 | Schmook | 358/75 |
| 1,923,208 | 8/1933 | Howey | 358/285 |
| 2,059,222 | 11/1936 | Fessenden | 358/75 |
| 2,185,806 | 1/1940 | Finch | 358/75 |
| 2,187,374 | 1/1940 | Finch | 358/75 |
| 2,422,778 | 6/1947 | Finch | 358/75 |
| 2,548,783 | 4/1951 | Goldsmith | 358/75 |
| 3,065,289 | 6/1962 | Pugsley | 358/80 X |
| 3,272,918 | 9/1966 | Koll et al. | 358/287 |
| 3,541,245 | 11/1970 | Wilby | 358/280 |
| 3,842,195 | 10/1974 | Takahashi et al. | 358/75 |
| 3,875,587 | 4/1975 | Pugsley | 358/80 |
| 3,878,559 | 4/1975 | Pugsley | 358/75 |
| 3,922,711 | 11/1975 | Sasabe et al. | 358/75 |
| 4,005,475 | 1/1977 | Knop | 358/80 |
| 4,054,916 | 10/1977 | Knop | 358/75 X |
| 4,096,519 | 6/1978 | Hoffrichter et al. | 358/75 |

FOREIGN PATENT DOCUMENTS 1095452 12/1964 United Kingdom .
1166091 4/1967 United Kingdom .

Primary Examiner—Robert S. Tupper
Assistant Examiner—Aristotelis M. Psitos
Attorney, Agent, or Firm—Joel I. Rosenblatt

[57] ABSTRACT

Four color separations are produced from a single full-color photographic transparency. The transparency is mounted on the transparent curved surface of a rotatable cylinder and light is directed axially into the cylinder and out through the transparency to a photomultiplier. The illumination of the transparency is provided by red, blue and green light in time sequence, and the itensity from each color is stored separately while the transparency is being scanned and used to produce the separations contemporaneously on photosensitive paper on a second cylinder. The transparency is scanned axially of the first cylinder, which is rotated. The relative speed of rotation of the cylinders is used as a control of the magnification of the reproduced separations. A further photomultiplier is used to provide unsharp masking, and color correction is applied between the color intensities detected by the photomultiplier.

3 Claims, 4 Drawing Figures

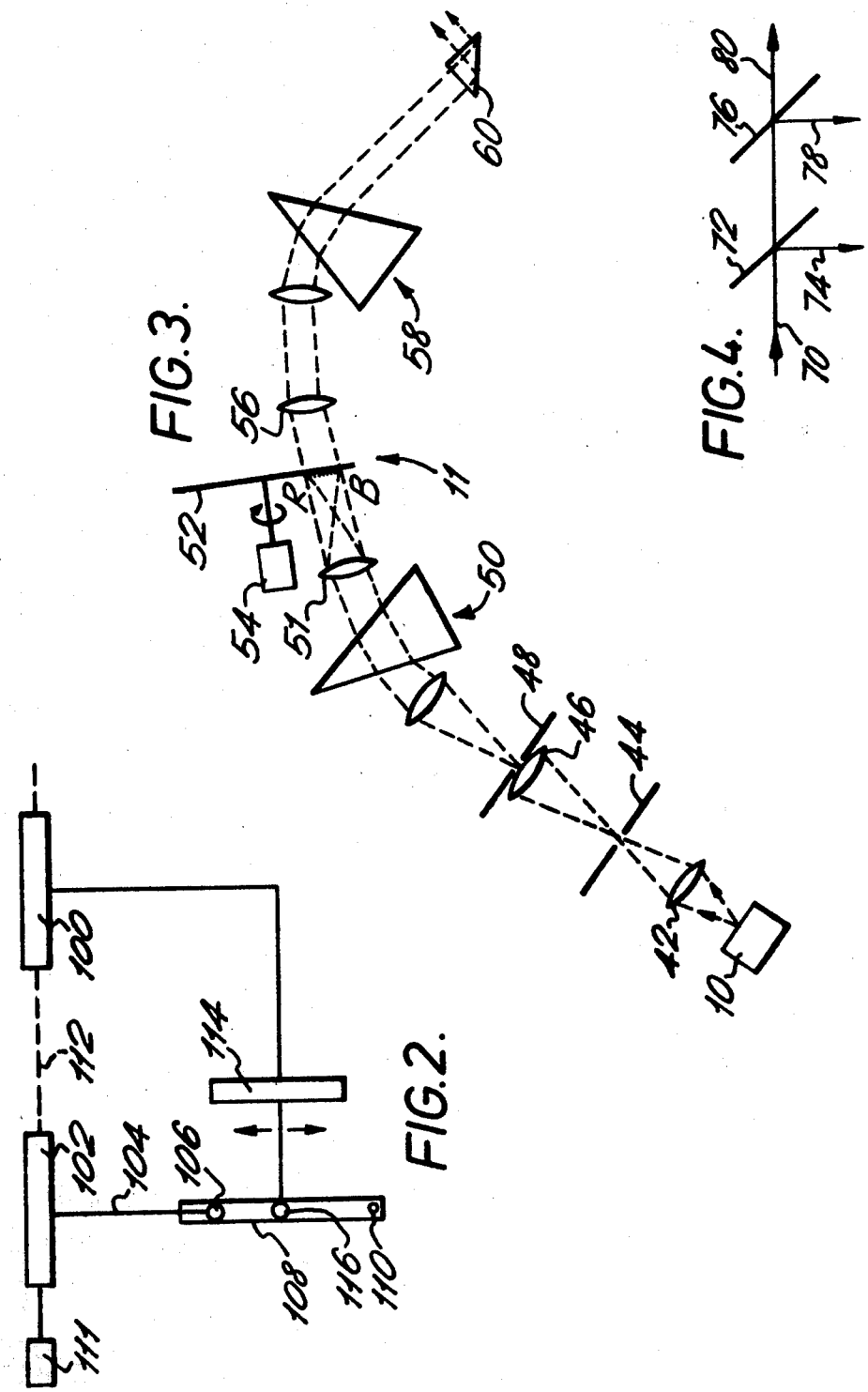

ELECTRO-OPTICAL SCANNING

This invention relates to apparatus for and a method of reproducing an image in a plurality of wavelength bands, and is particularly, though not exclusively, concerned with the reproduction of coloured images.

In one known color reproduction system employing an electro-optical scanner, a photographic colour transparency bearing the image to be reproduced is mounted on the curved surface of a cylindrical input drum that is rotated about its axis. Light is directed through the transparency and detected by a scanning system that includes three photomultipliers disposed behind blue, green and red filters respectively so as to detect the intensities of the transmitted blue, green and red light color components. The intensity information obtained from the photomultipliers is adjusted, for color correction for example, before being arranged to control the exposure, i.e. the operating time and intensity, of a further light source. The further light source is arranged to illuminate unexposed photo-sensitive material, e.g. photographic film, that is mounted on the curved surface of another cylindrical drum that is directly driven by the drive shaft of the input drum, so as to reproduce thereon the required color separations. Four color separations, corresponding respectively to blue, green, red and black are usually produced, and these are used to produce printing plates for multiple reproduction of the colored image from the original color transparency. Unsharp masking is also employed, this process comprising detecting the light intensity after transmission through the transparency, at a larger aperture than as received by the three photomultipliers. A fourth photomultiplier serves as an unsharp masking detector, and its output signal is used in comparison with the first three photomultipliers to generate a small fringe at the boundaries between adjacent colors, which provides the visual effect of increased sharpness. The unsharp masking photomultiplier is commonly arranged to detect light of only one of the blue, green and red colors, usually the green, since for most purposes precise matching to one color allows a sufficiently good approximation to be made for matching the remaining two colors. Complete matching can be achieved by providing three unsharp masking photomultipliers, one for each of the main intensity-detecting photomultipliers.

A disadvantage of such a reproduction system is the large number of photomultipliers that is required. The system is expensive, and also subject to inaccurate color reproduction owing to drift, and in particular relative drift, of the outputs of the photomultipliers.

The present invention resides in the provision of a method of image reproduction, and apparatus for carrying out the method, whereby only two radiation detectors are needed even for the complete reproduction of a colored image.

In accordance with one aspect of the present invention, there is provided an apparatus for reproducing an image in a plurality of wavelength bands, the apparatus comprising detector means and means arranged to cause radiation incident on the detector means from an image to be reproduced to lie within different wavelength bands in a predetermined time sequence.

In accordance with another aspect of the present invention, there is provided apparatus for reproducing an image in a plurality of wavelength bands, the apparatus comprising:

light source means,
light detector means,
means for directing light from the light source means along an optical path to be incident on the light detector means,
means for mounting an image to be reproduced so as to be intercepted by light on said optical path, and
means for restricting light on at least a portion of the optical path to different wavelength bands in a predetermined time sequence.

In accordance with a further aspect of the present invention, there is provided a method of reproducing an image in a plurality of wavelength bands, wherein radiation directed on to detector means from an image to be reproduced lies within different wavelength bands in a predetermined time sequence.

In this way, for reproduction of a colored image for example, only one detector is required to determine the intensity of the component colors and only a single unsharp masking detector is required. Both detectors, which preferably are photomultipliers, are arranged to receive the same color component light simultaneously, and to receive the color components sequentially. Preferably the color components are blue, green and red. The colour components may conveniently be obtained from a white light source, for example by passing the light through a prism so as to produce a spectrum. Alternatively, the splitting of the light into its component colors can be effected by passing white light through a rotating filter disc so as sequentially to transmit the different color components. The splitting of the light may be carried out either before or after it has been used to illuminate the image, for example before or after transmission through a transparency or reflection from a print surface.

It is also envisaged that a plurality of light sources, each corresponding to a required color component, may be used so as to avoid the necessity of beam splitting of composite-component light.

BRIEF DESCRIPTION OF THE DRAWINGS

FIG. 2 shows the pantograph system.
FIG. 3 shows the optical system for illuminating the transparency.
FIG. 4 shows an alternative optical system using dichroic filters.

Figure 1:
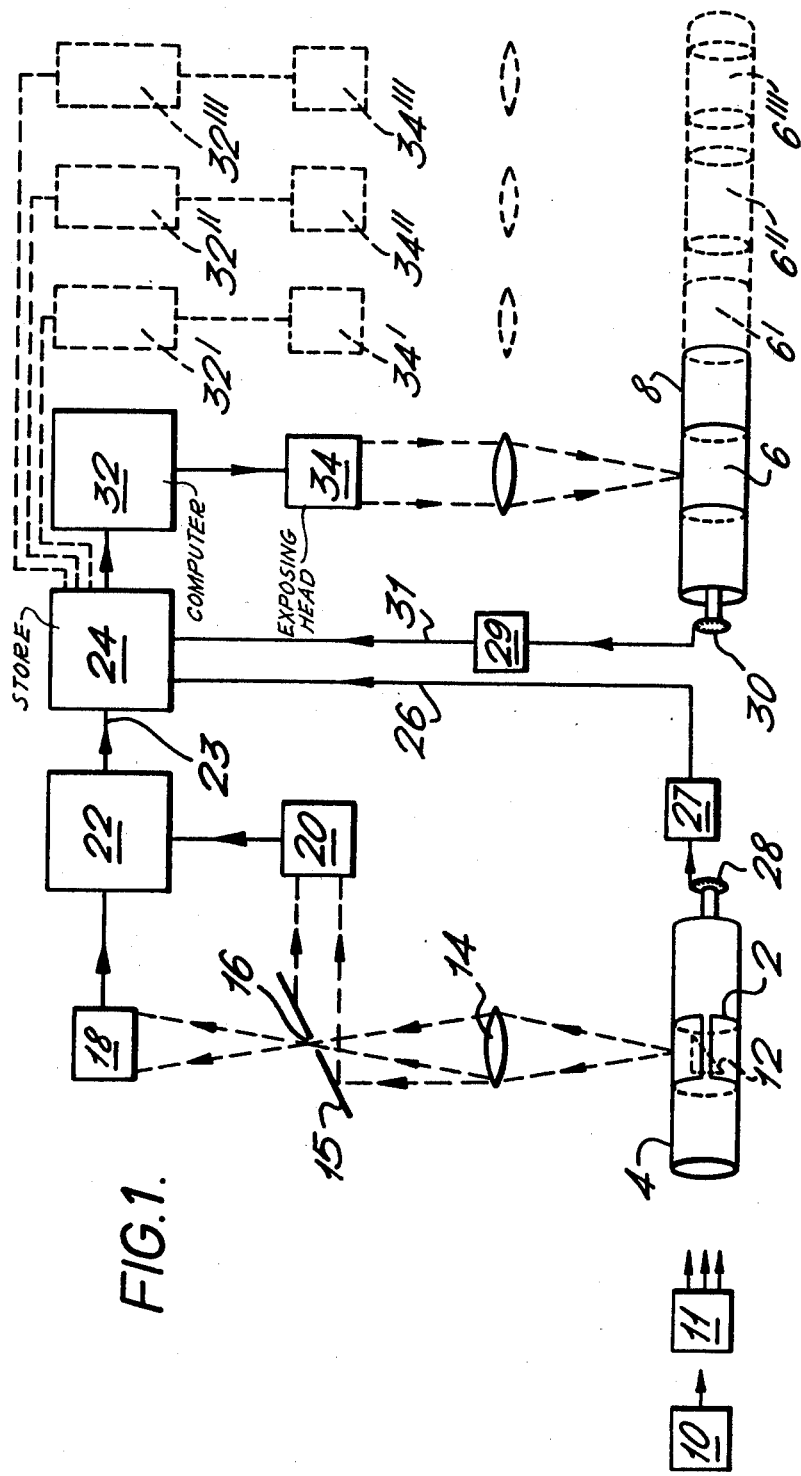
FIG. 1 shows a facsimile transmission system.

The method and apparatus of the invention will now be further explained, by way of example, with reference to the accompanying drawings.

Referring to FIG. 1, a photographic color transparency 2 is mounted on the curved surface of a rotatably-mounted cylindrical input drum 4. It is required to reproduce the image on the transparency 2 as monochrome separations on photosensitive material 6, for example photographic film. The material 6 is mounted on the curved surface of a further rotatably-mounted cylindrical drum, an output drum 8.

A light source 10 is arranged to shine light of blue, green and red components via an optical system 11 (as hereinafter described) sequentially along the axis of the input drum 4, and then via a prism, or other reflector 12 to a focus on a small area of the transparency 2. The transmitted light is collected by a converging lens 14 and focussed on to an optical stop 15. An aperture 16 in the stop 15 allows a certain amount of the light that has passed through the image 2 to fall on a photomultiplier 18. The remainder of the light that falls on the stop 15 is reflected or scattered from around the aperture 16, out of focus, on to a second photomultiplier 20. The light directed on to the photomultiplier 18 is indicative of the density of the small focussed area of image on the transparency 2 as seen through light of the instantaneous component color, blue say. The light incident on the photomultiplier 20 is used for the unsharp masking. As the input drum 4 rotates information received by the photomultipliers 18 and 20 is representative of the density along one circumferential line of the transparency 2 as seen by illumination with the successive component colors. The information from the photomultipliers 18 and 20 is fed separately to a gain control circuit 22, and thence via a line 23 to a store 24.

The light source 10 directs through the transparency 2 blue, green and red light sequentially on each revolution of the drum 4, such that the density of each circumferential line of the transparency is detected in each case, and stored in the store 24 for production of respective monochrome prints or photographic plates.

The store 24 may be considered as comprising three sub-stores 24b, 24g and 24r, each of which has a store location corresponding to a particular point on the circumference of the input drum 4. The color density of a circumferential line of the transparency 2 is scanned during one revolution of the drum 4 as illuminated by blue light, and the locations of the sub-store 24b filled. Sub-store 24r is filled on the next revolution of the drum 4. The store 24 is thus filled sequentially.

The input drum 4 is rotated at approximately three times the speed of the output drum 8, since three sets of information are required from each circumferential line of the color transparency 2 to reproduce a single line of each monochrome separation on the drum 8. Conveniently, the output drum 8 is rotated at 750 r.p.m. and the input drum at 2250 r.p.m.

The speed at which the density information is read into the store 24 along the line 23 is governed by the frequency of a pulse signal fed to the store 24 along a line 26 after passing through a frequency synthesiser 27 from a frequency generator 28 that is connected to the input drum 4. The frequency generator 28 can conveniently be provided by a light source, optical grating and a photocell. The speed at which information is taken from the store 24 is different from the read-in speed, and is determined by a similar frequency synthesiser 29, receiving pulses from a generator 30 driven by, and at the same speed as, the output drum 8. The store 24 is arranged to have the capacity to store information as to the optical density of the transparency 2 as seen through each of the illuminating component colors, for a single circumferential line of the input drum 4. Thus, when scanning of the transparency proceeds to an axially-displaced circumferential line, as hereinafter described, the new information is deposited in the same storage locations for read-out to produce the separations on the output drum 8.

The color density information in the store 24 is fed to a computer 32, which may be analogue or digital. Although as explained above, the store 24 is filled sequentially, the information is passed on to the computer 32 in a parallel mode. That is to say, the computer 32 is supplied at any one time with the information stored in all of the sub-stores 24b, 24g and 24r from corresponding locations, and thus corresponding to a single circumferential point on the drum 4.

Color correction is applied in the computer 32. For example, the density of any one color component may be biassed in accordance with the density of the other two component colors so as to reproduce from the separations a final color print of the same coloring as the original transparency 2. The apparatus may be modified in that the positioning of the store 24 and parts of the computer 32 may be interchanged. For example, tone correction and unsharp masking may be carried out before storing any information, since each of these adjustments is related to only one of the light components as opposed to a combination thereof. It should be noted, however, that color correction has to take place after the individual color component information has been removed from the store 24.

The information from the computer 32 is effective to control the intensity and duration of a light source 34 that is arranged to expose the photosensitive material 6 on the output drum 8.

It will be appreciated that the information obtained from the color transparency 2 for the production of the separations may in addition, or alternatively, be stored otherwise than as described for the store 24, on magnetic tape for example.

The computer 32, light source 34 and associated optical components for exposing the film or other material 6 on the drum 8, constitute an exposing head, and either a single exposing head can be used to produce the four separations end-to-end around the circumference to the drum 8, or two or more exposing heads can be employed so as to produce a greater number of separations side-by-side axially of the drum 8, as indicated by dashed lines and primed reference numerals in FIG. 1. As a further alternative, a single computer 32 may be used to control several exposing heads.

The light-production and detection system including the reflector 12 associated with the input drum 4, is arranged to be driven axially of the drums at a constant speed, so that the whole surface of the transparency 2 is illuminated in a spiral form. This motion can conveniently be effected by a pantograph action controlled by the corresponding axial motion of the exposing head, or heads, along the output drum 8. Enlargement or reduction of the separations on the output drum 8 with respect to the transparency 2 in a direction axially of the drums is effected by relative adjustment between the scanning speeds of the transparency 2 and of the photosensitive material 6.

FIG. 2 shows schematically the pantograph system employed for driving an input carriage 100 which carries the light production and detection system associated with the input drum 4, and for driving an output carriage 102 which carries the exposing head, or heads, associated with the output drum 8. The output carriage 102 has one end of a connecting rod 104 fixed thereto, the other end of which is slidably mounted by means of a roller bearing 106 within a guide member 108 that is mounted for pivotal movement about a point 110. Only a single drive motor 111 is required, and this acts directly to effect movement of the output carriage 102 along a line 112 that extends axially of the input and output drums 4 and 8. A further arm 114 of the pantograph system is mounted for movement within the guide 108 by means of a roller bearing 116, and is rigidly connected to the input carriage 100. The system is thus effective to translate movement of the directly-driven output carriage 102 into parallel movement of the input carriage 100 and, by suitable positioning of the roller bearings 106 and 116 within the guide 108 is effective to produce movement of the input carriage that is precisely and predeterminedly scaled with respect to the movement of the output carriage. The scaling can be chosen so as to effect enlargement or reduction of the separations on the output drum 8 compared to the transparency 2 on the input drum 4.

Enlargement or reduction in a direction circumferentially of the drums 4 and 8 will now be considered.

As has been explained, each circumferential line of the transparency 2 must be scanned three times to provide information for one line of the photosensitive film 6 on the output drum 8 i.e. one line for each of the blue, green and red separations. Accordingly, the most efficient usage of the color reproduction system occurs when the input drum is rotated at three times the speed of the output drum. This results in a fixed reduction by a factor of three when the information is written on to the separations at the same speed as it is read from the transparency 2.

The magnification M of the separations with respect to the original in this direction can be expressed as:

$$M = N/(D \times S),$$

where pulses are supplied to the store 24 along the line 26, to control the flow of information along the line 23, at a rate which is N times that at which they pass along the line 31, to control the deposit of information on the material 6 from the computer 32. These rates are expressed in terms of pulses/revolution of the respective input and output drums 4, 8, where the input drum 4 rotates at S times the speed of the output drum 8, and where the diameter of the input drum 4 is D times that of the output drum 8. Clearly, the magnification M can be greater or less than unity, depending on the values chosen for the parameters N, D and S. For practical convenience, D and S are preferably kept constant so that variation in the magnification is controlled by N, the ratio of the read and write rates.

It is also convenient although not essential to use a fixed picture element size on the output drum 8. If the store contains P words that is to say if the density information of a single line extending circumferentially of the drum 4 is stored in P locations, thus defining the resolution of the system, and if the photo-sensitive material 6 extends around the output drum 8 so as to substend an angle $\theta$ at the centre, the rate of reading from the store 24 will be $$P \times 2\pi/\theta) \quad \text{elements/revolution of the drum 8.}$$

The rate of reading is synchronised to rotation of the drum 8 by the pulse signals on line 31, the signals being derived from a generator 30 which is locked to the rotation of the drum and multiplied to the required rate by a frequency synthesiser 29 the multiplication ratio being fixed at $$R_{29} = \frac{P \times 2\pi}{L \times \theta}$$

where L is the number of pulses per revolution from the generator 30. The input drum 4 is equipped with a similar system but the ratio of the frequency synthesiser 27 is arranged to be varied, and can be considered as $R_{27} = K \times E$ where K is a constant and E is variable by means of a control on the synthesiser 27. The constant K is chosen to be $$K = D \times S \times (2\pi/\theta) \times (P/L)$$

the ratio of the write to read rate (N) is now equal to $$N = \frac{R_{27}}{R_{29}} = \frac{D \times S \times \frac{2\pi}{\theta} \times \frac{P}{L}}{\frac{2\pi}{\theta} \times \frac{P}{L}} \times E$$

$$= D \times S \times E$$

so $$M = \frac{D \times S}{D \times S} \times E = E$$

Thus the magnification is equal to the controllably variable part of the analysis frequency synthesiser multiplication ratio.

As explained, a difference in the diameter or the relative speed of rotation of the input and output drums will manifest itself as an enlargement or reduction of the resulting separations with respect to the original transparency, so that a convenient enlargement or reduction value can be chosen.

If the ratio of the speeds of rotation of the input and output drums is three, then optimum resolution is obtained without introducing any redundancy into the store 24.

In some circumstances it may be found acceptable not to use all three sets of information from each line of the transparency for producing the separations. For example, for printing magenta, the red, blue and green information may be stored in the store 24, and read out in the following sequence: green, red, green, blue, green, red, green, blue, etc. This sequencing improves the resolution of the green component, which is the main component required to print magenta, to 1:2 from the ratio 1:3 that would be obtained if all three colors, were given equal attention. A lower resolution, of 1:4, is consequently obtained for the remaining, so-called correction, colors. Corresponding sequencing can be adapted where the main color component is red or blue. Finally under these conditions, the optimum speed ratio of the drums becomes 2:1 rather than the previous 3:1.

The optical system for illuminating the transparency 2 will now be briefly described with reference to the schematic arrangement of FIG. 3. The light source 10 comprises a xenon arc light, the light output of which is collected by a lens 42, directed through an aperture-defining plate 44, to a lens 46 and then through a further aperture-defining plate 48 before being directed as a parallel beam through a color splitting prism system 50 that comprises a prism and two lenses. The light output from the final lens 51 of the system 50 is directed on to a filter disc 52 for transmitting blue, green and red light respectively.

The prism of the system 50 acts to divide the incoming white light into a spectrum, and the lens 51 focusses each spectral line on a different point of the disc 52, each point being an image of the aperture of the plate 44. A spectrum thus appears on the disc 52 extending from red R to blue B, and the disc 52 has three approximately 120° arcuate slots spaced apart axially thereof. The disc 52 is rotated in the light path by a motor 54 at precisely one third the speed of the input drum 4, so as to direct on to a collecting lens 56 the sequentially colored light. The light transmitted by the lens 56 then passes to a further prism system 58, for collecting the sequentially-colored light as a parallel beam and passing this on to a prism or other reflector 60 that is arranged to transmit the parallel beam axially of the input drum 4 to the prism 12 which is disposed therewithin. Thus, since the prism 12, which is mounted as described for movement axially of the drum 4, receives the sequentially-colored light as a parallel beam, the illumination of the transparency 2 does not change during scanning.

An alternative optical system for efficiently producing the separate color components from white light involves the use of dichroic filters, and is shown schematically in FIG. 4, the optical focussing and directing components being omitted for clarity.

White light 70 is directed obliquely on to a first dichroic filter 72. Substantially all the blue light is arranged to be reflected from the front surface of the filter 72 to provide a beam 74, one of the required beams, the rest of the light being transmitted to a second dichroic filter 76. The filter 76 is arranged to reflect substantially all of the incident red light so as to provide a second of the required beams, beam 78. The light transmitted by the filter 76 is then the third required beam, beam 80, and comprises substantially only green light. Each of the required beams, 74, 78 and 80 comprise approximately 80% of the total individual colors of the incident white light beam 70.

Whatever optical system is employed to produce the individual color components for illuminating the transparency 2, the individual pass bands can be arranged to correspond exactly to the response of the human eye to each of these components, so as to provide visually faithful color reproduction. Alternatively, and to the same end, the optical system can be arranged to introduce color corrections, into the light incident on the transparency, that are related to the color correction curves of the printing inks to be used in the final production of the color print from the transparency 2.

We claim:

1. An apparatus for reproducing a color corrected image from an original comprising:
   means for sequentially scanning an elemental area of an original, said elemental area having separate and distinct color bands,
   means for generating sequential signals responsive to said color bands, means for simultaneously storing said generated signals, each said signal stored corresponding to said elemental area and to a distinct color band, means for correcting said stored signals to produce a desired balance between said color bands in said elemental area, means for imaging on an image receiving surface, said means for imaging includes a modulating means, and said modulating means connected to said storing means for modulating said imaging means responsive to at least one said corrected signal, said imaging means being directed at an elemental area on the imaging surface corresponding to the sequentially scanned elemental area on the original, to produce a corrected image for the said elemental area means for displacing said means for scanning and said means for imaging, said original having a plurality of elemental areas defining said original whereby said original may be reproduced by separately reproducing each of said original elemental areas and, including a pantograph system having a guide, a first roller bearing mounted for movement in said guide and connected to said imaging means, said guide being mounted for pivotal movement at one end of said guide, a second roller bearing mounted within said guide connected to said scanning means, said second roller bearing mounted in said guide between said first roller bearing and said pivoting means whereby said pantograph transfers parallel movement between said scanning means and said imaging means, and the said position of said first roller bearing relative to said second roller bearing, determining the respective movement of said imaging means to said scanning means.

2. An apparatus for reproducing a color corrected image from an original comprising: means for sequentially scanning an elemental area of an original, said elemental area having separate and distinct color bands, means for generating sequential signals responsive to said color bands, means for simultaneously storing said generated signals, each said signal stored corresponding to said elemental area and to a distinct color band on said original, means for correcting said stored signals to produce a desired balance between said color bands in said elemental area, means for producing an image on an image receiving surface, said means for imaging includes a modulating means, and said modulating means connected to said storing means for modulating said imaging means responsive to at least one said corrected signal, said imaging means being directed at an elemental area on the imaging surface corresponding to the sequentially scanned elemental area on the original, to produce a corrected image for the said elemental area, means for displacing said means for scanning and said means for imaging, said original having a plurality of elemental areas defining said original whereby said original may be reproduced by separately reproducing each of said original elemental areas, and including a pantograph system having a guide means, first and second roller bearings mounted in said guide means, said guide means being pivoted at an end, said second roller bearing being connected to said imaging means, movement of imaging means displacing said guide means about said pivot means and displacing said second roller bearing and said scanning means proportional to said distance moved by the imaging means.

3. The system of claim 2 wherein said first roller bearing is connected by a rigid connection to said imaging means and said second roller bearing is connected by a rigid connection to said scanning means, displacement of said imaging means displacing said guide means about said pivot and through an angle, and movement of the scanning means, being proportional to the displaced angle of the guide means.

* * * * *